United States Patent [19]

Schweiger

[11] Patent Number: 4,661,312
[45] Date of Patent: Apr. 28, 1987

[54] PRESSURE RELIEF SYSTEM IN NUCLEAR REACTORS

[75] Inventor: Fritz Schweiger, Hagen, Fed. Rep. of Germany

[73] Assignee: Hochtemperatur-Kernkraftwerk GmbH (H K G), Hamm, Fed. Rep. of Germany

[21] Appl. No.: 628,140

[22] Filed: Jul. 10, 1984

Related U.S. Application Data

[63] Continuation of Ser. No. 383,245, May 28, 1982, abandoned, which is a continuation of Ser. No. 165,504, Jul. 3, 1980, abandoned.

[30] Foreign Application Priority Data

Aug. 1, 1979 [DE] Fed. Rep. of Germany ....... 2931140

[51] Int. Cl.[4] .................... G21C 9/00; G21C 19/20
[52] U.S. Cl. .................... 376/283; 376/309; 376/310; 376/313; 376/314; 376/203
[58] Field of Search ............... 376/282, 283, 308, 309, 376/310, 313, 314, 383, 391, 307, 371, 203

[56] References Cited

U.S. PATENT DOCUMENTS

| | | | |
|---|---|---|---|
| 3,376,357 | 4/1968 | Black | 376/313 X |
| 3,459,635 | 8/1969 | Bevilacqua et al. | 376/313 |
| 3,544,424 | 12/1970 | Mayer et al. | 376/371 |
| 3,700,550 | 10/1972 | Shiells | 376/313 |
| 3,722,578 | 3/1973 | Frei et al. | 376/307 |
| 3,889,707 | 6/1975 | Fay et al. | 376/203 X |
| 3,993,540 | 11/1976 | Longton et al. | 376/313 |
| 4,012,490 | 3/1977 | Lofredo | 376/314 X |
| 4,043,865 | 8/1977 | Kausz et al. | 376/310 |
| 4,056,436 | 11/1977 | Bukrinsky et al. | 376/283 |
| 4,118,317 | 10/1978 | Neeb et al. | 376/314 |
| 4,123,324 | 10/1978 | Sanada et al. | 376/313 |
| 4,216,057 | 8/1980 | Heitmann | 376/310 |
| 4,495,137 | 1/1985 | Otsubo | 376/205 X |

FOREIGN PATENT DOCUMENTS

| | | | |
|---|---|---|---|
| 2049792 | 4/1972 | Fed. Rep. of Germany | 376/309 |
| 2601460 | 1/1978 | Fed. Rep. of Germany | 376/309 |
| 0056297 | 5/1977 | Japan | 376/309 |
| 0017896 | 2/1978 | Japan | 376/308 |

OTHER PUBLICATIONS

"Abstract from Ullmann's Encyclopedia of Technical Chemistry", *Chemical Properties of Rare Gases*, pp. 192-195, 1955.

Primary Examiner—Deborah L. Kyle
Assistant Examiner—Dan Wasil
Attorney, Agent, or Firm—Toren, McGeady and Goldberg

[57] ABSTRACT

A nuclear reactor, particularly a light water reactor or a helium-cooled high-temperature reactor, is provided with a pressure relief system for relieving pressure resulting under fault conditions from coolant in the reactor pressure vessel and/or the protective vessel of the reactor, wherein the coolant is conducted from the vessel or vessels to a pressure relief station downstream thereof. At the pressure relief station the coolant is fed into a liquid reservoir 4 from which the coolant in gaseous or vapor form is fed sequentially through a washing cyclone 13 and a drying cyclone 25. Most of the radioactive fission products carried by the coolant will have been removed by the liquid reservoir 4 and the washing cyclone 13, and the coolant leaving the cyclone 25 may be safely discharged to atmosphere. Both the liquid reservoir 4 and the washing cyclone 13 are provided with cooling circuits 8 to 12 and 14 to 23 respectively for the liquids.

20 Claims, 1 Drawing Figure

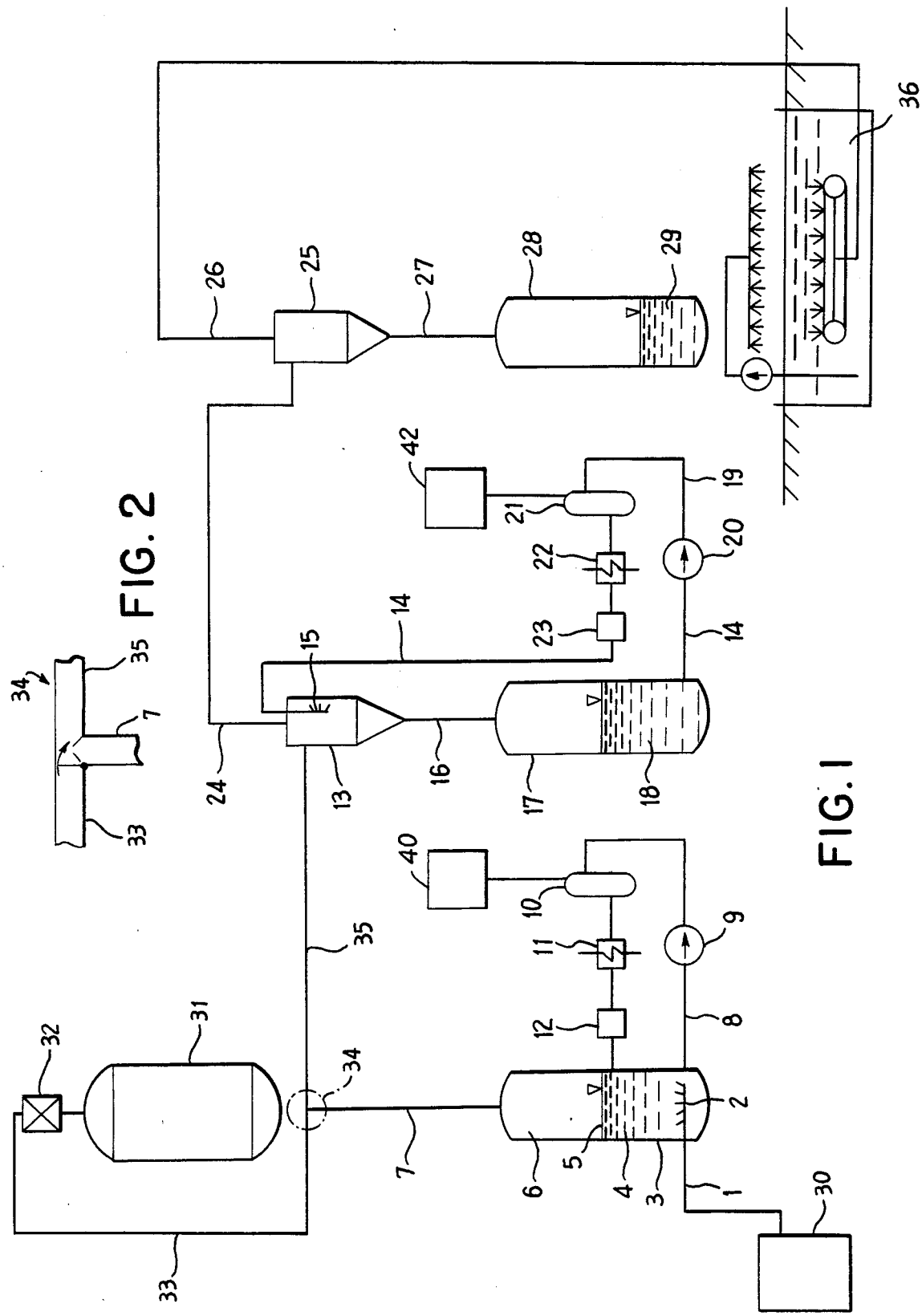

PRESSURE RELIEF SYSTEM IN NUCLEAR REACTORS

This is a continuation of application Ser. No. 383,245, filed May 28, 1982 which in turn was a continuation of application Ser. No. 165,504 filed July 3, 1980, both now abandoned.

This invention relates to pressure relief systems for relieving the pressure in nuclear reactors in the event of failure or a fault, especially in light water reactors and helium-cooled, high-temperature reactors.

For light water reactors and also for high-temperature reactors, closed protective vessels are required. These vessels are intended, if a fault occurs in the reactor pressure vessel, or its piping systems, for receiving the escaping coolant, such as steam or helium. The coolant can contain gaseous or solid radioactive fission products or other activated substances. In the event of a fault the protective vessel is consequently filled with radioactive coolant which is under high pressure and at a relatively high temperature and thus renders impossible access for operating personnel, even if these persons wear protective clothing or breathing equipment. In the event of such a fault or failure however, accessiblity of the protective vessel is of advantage, to enable the reactor to be converted by local manual operation into a safe operating state.

It is furthermore necessary, for example if all the heat sinks for the coolant fail, to make possible removal of the heat from the reactor pressure vessel via an emergency cooling system, before the primary circuit fails or the fuel elements in the reactor core are destroyed. In order to prevent overheating of the fuel elements, a coolant can be additionally supplied to the reactor pressure vessel in a so-called open circuit. It is, however, not permissible to discharge into the atmoshphere coolant which is contaminated with radioactive constituents.

Pressure-relief systems are intended, when a fault or failure occurs, for reducing the pressure in the reactor pressure vessel and/or sometimes in a protective vessel which contains the reactor pressure vessel.

At present various devices are known which, according to their various purposes such as the purification of the coolant or the protective vessel atmosphere or pressure reduction in protective vessels, are provided primarily for operation under normal operating conditions of the reactor.

Air extraction plants are known for protective vessels under normal operating conditions, in which, in order to keep the extraction plant to small dimensions, air is sucked out of the vessel, purified in filters and returned to a so-called re-cycling air process to the protective vessel. Consequently, only a small quantity of air, possibly contaminated with radioactive gas or dust, flows slowly through a filter of the air extraction plant and is discharged, after purification, to the atmosphere, in order to generate inside the protective vessel a slight sub-atmospheric pressure. The filters in such plants, however, have too small a capacity for fault conditions and are also not suitable for filtering out those fission products, such as iodine, caesium and strontium, which can be discharged in fault conditions perhaps in conjunction with large quantities of steam.

Furthermore, degassing devices for light water and pressurized water reactors are known. in which, during operation, air and other gases are extracted in the water/steam circuit with the help of a vacuum pump from the coolant in a turbine condenser in order to improve the vacuum and are discharged via filters to the atmosphere. So-called filter-absorbers, in which inert gases such as krypton and xenon are retained until their natural decay, serve as filters. These filters are cooled in order to remove the decay heat and to achieve better absorption as a result of the reduced temperature. These filters are also not suitable for filtering the fission products which are discharged in larger quantities under fault conditions.

In known pressure-relief systems for fault conditions in a nuclear reactor, coolant escaping from a leak in the reactor pressure vessel or piping system of the primary circuit is precipitated with the assistance of a water sprinkler system in the interior of the protective vessel. The sprinkled water is supplied by pumps from a water vessel and, after its contents are exhausted, the water is sucked up from a sump in the protective vessel, cooled in coolers and is then sprinkled again into the protective vessel, in order to condense the coolant vapour and thus reduce the pressure. In pressurized water reactors, for nuclear physical reasons, borated water, that is water comprising 2000 to 3000 ppm boron, is used as a sprinkling agent with the intention of washing out the fission products which enter the protective vessel together with the coolant. In order to achieve better water solubility of iodine, sodium hydroxide or sodium thiosulphate, for example, are added to the water. Among the fission products, those that can be washed out, such as caesium, strontium and barium, and also the gaseous iodine which can be washed out to a limited extent due to the relatively high coolant temperature, should be distinguished from those fission products that can only be washed out with difficulty, such as the inert gases xenon and krypton and possiblity also methyl iodide. The inert gases and methyl iodide are hardly transferred into the gas or liquid respectively during the condensation or evaporation of the cooling liquid. The methyl iodide forms only after a certain time, if elementary iodine reacts with organic substances such as oils and grease in the protective vessel under the influence of temperature. The gaseous iodine is dissolved and washed out by the sprinkler system with an efficiency of 99% if the sprinkling agent is furnished with its additives. The iodine constituent decreases in the course of time and also as a consequence of natural deposition on the surfaces wetted with iodine. By contrast, methyl iodide is considerably more difficult to wash out than elementary iodine.

Such pressure relief systems suffer from the disadvantage that the sprinkling agents used tend to corrode the components in the interior of the protective vessel. The degree of corrosion is dependent upon the particular sprinkling agent and the chemical additives contained in it. A boron solution attacks particularly zinc and paints. Aluminum alloys are severely attacked by borax solutions and especially aluminum and copper are attached by sodium thiosulphate solutions. The degree of corrosion is still further intensified by the sprinkling of the components as compared with complete immersion. In certain cases insoluble corrosion products can result from the corrosion, and can have an especially harmful effect due to the deposits on important components.

In these existing pressure relief systems a further disadvantage lies in the fact that the corrosion caused by sprinkling, especially of aluminum and zinc, leads in the protective vessel to the formation of hydrogen which can rise above the critical concentration of 4% by volume. This increases the danger of the event of a fault. In order to prevent a critical hydrogen concentration occurring, it would be necessary to ventilate the protective vessel and thereby accept an admittedly controlled release of fission products.

The sprinkling agent furthermore causes condensation of the coolant which reaches the protective vessel in the event of a fault, especially after the already condensed coolant has been pumped out. Consequently, a low sub-atmospheric pressure can result in the protective vessel. Known protective vessels are so designed that they can withstand pressure from outside as well as an excess pressure inside; they cannot, however, be designed to withstand a comparatively high vacuum in the interior.

It furthermore proves to be a drawback that the sprinkling agent in the sump of the protective vessel is supplied back to the sprinkling system. As a result, the fission products such as iodine that are dissolved in the sprinkling agent again enter the atmosphere of the protective vessel during continued sprinkling. Consequently, the efficiency of the washing out of the radioactive products is adversely affected.

A further drawback of the known pressure relief systems lies in the fact that, in the event of a fault, the protective vessel filled with the cooling and sprinkling agent which in certain circumstances is radioactive, is not accessible to the operating personnel.

In the presently known helium-cooled high-temperature reactors, condensation of the helium is impossible. Its radioactive impurities during normal operation are so slight that it can be discharged unpurified to the atmosphere. Under fault conditions, however, the level of impurities can be higher if, for instance, a tube burst occurs in one of the steam generators and high-pressure steam flows into the primary circuit which is filled with helium. A high-temperature reactor is therefore known, for instance, in which so-called mixing coolers are connected downstream of excess pressure valves of the primary circuit. These coolers have water sumps in which the steam is condensed, while the helium accumulates in the cooler above the water sump.

In a further known high-temperature reactor, no excess pressure valves are provided, because if a tube in one of the steam generators bursts, the steam entering the primary circuit can be condensed by operating measures in a number of remaining steam generators, so that an unacceptable pressure rise is avoided. It is, however, expected that the devices which effect the operating measures shall function absolutely reliably. Such devices are, therefore, technically very complicated and expensive.

The object of the present invention is to provide a pressure relief system for relieving the pressure which occurs under fault conditions in the pressure vessel or protective vessel of a nuclear reactor, the system providing a new technique for the pressure relief and also if necessary for emergency cooling of the reactor coolant whereby the above-described disadvantages of pressure-relief systems comprising sprinkling systems or the free relief of pressure from a reactor pressure vessel are avoided. The system in accordance with the invention may also, if required, provide open-cycle additional feed of coolant whilst avoiding the discharge of radioactive constituents of the coolant to the atmosphere.

According to the invention a nuclear reactor having a pressure relief system for relieving the pressure in the reactor pressure vessel and/or the protective vessel of the reactor in the event of a fault resulting in coolant at excess pressure in the vessel or vessels, is characterized in that the pressure relief system comprises a pressure relief station which is connected downstream of the reactor pressure vessel and/or the protective vessel, and to which the coolant is fed when the pressure in the vessel or vessels is to be relieved, the pressure-relief station including means for washing the coolant.

In the case of a pressure rise in the reactor pressure vessel or protective vessel, the pressure-relief system will accordingly cause a purification of the coolant with simultaneous pressure reduction. The pressure-relief system must here be so designed that the pressure vessel surrounding this pressure vessel shall remain closed in accordance with the specifications in respect of the radioactive fission products, whereas the coolant, largely purified of radioactive products, can discharge to atmosphere. Furthermore, the protective vessel remains substantially free of coolants. In addition, contact of the unwashed coolant, possibly containing elementary iodine, with oil or grease from the auxiliary equipment of the reactor in the reactor protective vessel is largely avoided.

The pressure-relief station preferably comprises two cyclones connected one after the other in series. The upstream cyclone of the two cyclones may be constructed as a washing cyclone, in which the coolant supplied thereto in gaseous and/or vapour form is set in a rotary motion so that, under the influence of the centrifugal force, dust particles or water droplets contained in the coolant are thrown against the cyclone wall and conducted away downwards. The cyclone may be provided with an axially arranged nozzle system which sprays in the washing liquid, for example water, radially, that is in the direction of the centrifugal forces. In the washing cyclone, in contrast to sprinkler installations, the coolant vapour is not intended to condense, but only to lose its superheated nature to a considerably smaller quantity of liquid, so that wet steam with a temperature below 100° C. results.

The cyclone downstream from the washing cyclone is preferably a drying cyclone in which the residual moisture in the coolant is centrifuged out by the centrifugal forces created in the cyclone.

A liquid reservoir or sump is preferably connected between the reactor pressure vessel and/or the protective vessel and the washing cyclone, the coolant conducted from the reactor pressure vessel and/or the protective vessel entering the liquid reservoir through a nozzle system disposed deep beneath the surface of the liquid in the reservoir or sump, in order to prevent so-called water hammer.

When the pressure relief station is connected to the protective vessel of a reactor, the liquid reservoir, by an appropriately selected height of the liquid column above the coolant outlet nozzles, can be used as an excess-pressure valve for the protective vessel, especially in a high temperature reactor. The reservoir or sump is also of advantage, because, under normal operating conditions of the reactor, an uncontrolled outflow of the air contained in the protective vessel is prevented, and the normal sub-atmospheric pressure in the protective vessel is not disturbed. Furthermore, the reservoir or sump does not suffer the disadvantages of a mechanical excess-pressure valve, such as jamming or leaking.

The height of the liquid column in the reservoir vessel, in conjunction with the protective vessel volume, can ensure that the circulating pump of a washing liquid cooling circuit, with which the washing cyclone is preferably provided, can start up before the coolant has forced its way into the liquid reservoir and reached the gas collecting space provided above the liquid in the reservoir.

When the pressure-relief station is connected to a reactor pressure vessel, it is necessary to connect an excess pressure valve upstream of the reservoir. In this case, a signalling contact in the excess pressure valve can be used to switch on the circulating pump in the cooling circuit of the washing cyclone before the excess pressure valve opens.

The reservoir provides, especially in gas-cooled high temperature reactors, an optimum, quasi homogeneous heat sink for the coolant. It is also particularly important for purifying the coolant by removing carbon dust, on which radioactive fission products usually become deposited.

In a helium-cooled, graphite-moderated, high-temperature reactor, the purifying effect of the reservoir for the fission products iodine, xenon, and krypton can be neglected. In this case the two series connected cyclones are sufficient for purifying the coolant. The washing cyclone is then operated with a washing liquid, preferably water. An addition of chemicals in order to make iodine water-soluble and thus capable of being washed out is possible, but is not necessary because in high-temperature reactors it has hitherto only been possible to detect iodine in negligible quantities in the coolant.

The reservoir, serving as cooler and dust separator, and the washing cyclone are preferably equipped with separate cooling circuits, for the reservoir liquid and the washing liquid respectively, each circuit including a gas separator, a cooler, and an ion exchanger. The gas separators may be connected to retention plants for inert gases separated from the circulating liquid, the plants already being provided for normal operation. The ion exchangers are preferably constructed as alluvial filters containing deposited powdered resins.

Preferably, especially in the case of light water reactors, the liquid circulating in the cooling circuit of the washing cyclone is water in which chemicals for washing out the radioactive fission product iodine are dissolved. Chemicals suitable for this purpose include sodium iodide and potassium iodide, in addition to the already named compounds such as sodium hydroxide and sodium thiosulphate.

Washing liquid may be supplied to the cooling circuit of the washing cyclone from a storage vessel, in order to compensate for loss of washing liquid flowing out together with the coolant from the cyclone.

In a preferred embodiment of a reactor having a pressure-relief system in accordance with the invention, the coolant leaving the pressure-relieving station, especially in high-temperature reactors, is discharged to atmosphere. The coolant in steam form from light water reactors can likewise also be discharged to atmosphere.

In a further embodiment, the cooled, purified and dried coolant is fed into sprinkling ponds for removing chemical additives such as acids, alkali liquors and salts.

As a result of the invention, the reactor pressure vessel and/or protective vessel of a reactor can be regarded as open in respect of the extraction and pressure-relief of coolant under fault conditions, but as closed in respect of the fission products contained in the coolant, because of the separating devices in the pressure-relieving station. In other words, the pressure relief system, in addition to providing pressure relief, simultaneously acts as a filter.

FIG. 1 is a schematic illustration of a pressure relief system for relieving the pressure which occurs under fault conditions in a pressure vessel or a protective vessel of a nuclear reactor; and FIG. 2 is a detail view of the circled portion in FIG. 1.

A coolant feed 1, which leads from a reactor pressure vessel and/or a reactor protective vessel, in FIG. 1 it leads from a reactor containment 30, is provided with a nozzle system 2 in a vessel 3 containing a reservoir 4 of water or other liquid, the nozzle system being disposed deep below the liquid surface level 5. The reservoir vessel 3 has above the liquid surface 5, an air and other gas collecting space 6 with a coolant line 7. The reservoir vessel 3 is provided with a cooling circuit 8 comprising a circulating pump 9, a gas separator 10, a cooler 11 and an ion exchanger 12 for the reservoir liquid 4. The coolant line 7 is connected to a washing cyclone 13. A washing liquid line 14 has a nozzle system 15 extending axially of the washing cyclone 13, and the cyclone 13 is connected via a discharge line 16 to a vessel 17 for the washing liquid 18. The washing liquid vessel 17 is connected, via a cooling circuit 19 comprising a circulating pump 20, a closed gas separator 21, a cooler 22, an ion exchanger 23 and the liquid line 14, to the nozzle system 15 in the washing cyclone 13. From the washing cyclone 13, a coolant line 24 leads to a drying cyclone 25, which has a coolant extraction line 26 and is connected via a discharge line 27 to a vessel 28 for separating residual moisture 29 from the coolant.

The coolant flowing from the reactor pressure vessel and/or protective vessel passes into the reservoir vessel 3 from the coolant feed 1, the coolant flowing into the reservoir liquid 4 through the nozzle system 2 disposed deep beneath the liquid surface 5. If the height of the liquid column above the coolant outlet nozzle system 2 corresponds to the maximum desirable coolant pressure, the reservoir liquid 4 will function as an excess-pressure valve for the coolant in the protective vessel. If, however, the pressure relief system is disposed downstream from a reactor pressure vessel 31, as in FIG. 1, the reservoir must have an excess-pressure valve 32 connected upstream of it. The reactor pressure vessel 31 is connected through the pressure relief valve 32 and line 33 by a two-way gate valve 34 to the coolant line 7, note FIG. 2. the gate valve 34 connects the line 33 to the reservoir vessel 3 through the line 7 or to the washing cyclone 13 through the line 35. In this case, the reservoir liquid 4 is not by itself capable of sealing and venting the reactor pressure vessel.

In the case of a pressure-relief system for high-temperature reactors, almost all the solid fission products can be deposited (adsorbed) on grapite dust in accordance with a process for separating undesired contaminants from the coolant helium which is known from German Patent Application No. P 26 01 460.8. The only exceptions from this deposition are iodine and mercury which, however, occur in high-temperature reactors only in small concentrations that are in the range of breathing air quality.

In the reservoir liquid 4, water-soluble fission products such as caesium and strontium, and sometimes also radioactive isotopes deposited (adsorbed) on the carbon dust, are removed from the coolant. The reservoir liquid 4 is extracted together with the impurities contained therein via the circulating pump 9 into the cooling circuit 8. In the gas separator 10, the coolant gases entrained by the reservoir liquid 4 accumulate. The inert gases deposited by the hydrateforming of the reservoir liquid, such as xenon and krypton, are also separated. These hydrates are extremely water-soluble, but no stable, so that a large part of the inert gases passes, like most of the coolant, through the reservoir liquid 4 into the gas collecting space 6. In the cooling circuit 8 the reservoir liquid 4, after passing through the gas separator 10, is cooled in the cooler 11 and is subsequently fed to the ion exchanger 12. In the ion exchanger 12 all the solid fission products such as caesium and strontium, are separated from the reservoir liquid 4 by an alluvial filter comprising deposited powdered resins. The purified and cooled reservoir liquid 4 is then recycled into the vessel 3.

The purified and precooled coolant, present in vapour and/or gaseous form in the gas collecting space 6, is drawn off from the vessel 3 via the coolant line 7 and is fed to the washing cyclone 13, in which dust particles or water droplets still contained in the coolant are separated.

Heat is removed from the coolant vapour by spraying in washing liquid, for example, water, so that wet steam with a temperature below 100° C. and a pronounced tendency to the formation of condensation nuclei is produced. The liquid circulating in the cooling circuit of the washing cyclone 13 is water, in which for example potassium iodide is dissolved. In the coolant in the form of steam, the non-water-soluble fission product iodine, which is gaseous on account of the coolant temperature, is contained. The potassium iodide additive in the washing liquid makes the iodine water-soluble in accordance with the equation $KI \times I_2 \rightleftharpoons K + I.I_2^-$. Consequently, the iodine can be washed out from the coolant in the washing cyclone 13.

The solid fission product particles contained in the coolant, such as caesium and strontium, form condensation nuclei on which even extremely small water droplets contained in the coolant and also dust precipitate, and can be washed out from the coolant.

The radioactive inert gases xenon and krypton can form hydrates with the washing liquid in the washing cyclone 13, these hydrates being water-soluble and being centrifuged together with the water droplets out of the coolant. Only a residue of the radioactive inert gases can flow out of the washing cyclone 13 into the coolant line 24 with the washed coolant, in which washing liquid can also be contained as a result of sprinkling losses.

In order to make up the loss of washing liquid in the washing cyclone, liquid is supplied to the cooling circuit 19 of the washing cyclone 13 from a storage vessel 17.

The washing liquid passes from the washing cyclone 13 via a discharge line 16 into the vessel 17. From the vessel 17, the washing liquid is drawn off to the cooling circuit 19 by the circulating pump 20. In the closed gas separator 21 predominantly radioactive inert gases, such a zenon and krypton, and also air, are separated from the washing liquid which is then cooled in the closed cooler 22 and is subsequently supplied to the ion exchanger 23, which has an alluvial filter the washing liquid. The purified and cooled washing liquid passes via the line 14 through the nozzle system 15 back into the washing cyclone 13.

The purified and cooled coolant exits from the cyclone 13 through the coolant line 24 to the drying cyclone 25, in which the residual humidity and the radioactive products contained therein are centrifuged out of the coolant. This separated water is extracted via the discharge line 27 from the drying cyclone 25 into the vessel 28 for residual moisture 29.

The purified, cooled and dried coolant leaves the drying cyclone 25 via the coolant extraction line 26 and can be fed to sprinkler ponds 336, in which, if required, further chemical additives such as acids, alkalies, and salts can be separated from the coolant, or it can be discharged to atmosphere in an already permissible manner, in the case of a light water reactor as steam, or in the case of a high-temperature reactor as cooled, purified gas, for example helium.

I claim:

1. In a nuclear reactor having a reactor pressure vessel with a reactor coolant circulating therethrough, a protective containment vessel for the reactor vessel, and a pressure relief system for relieving excess pressure in at least one of the reactor pressure vessel and protective vessel resulting under fault conditions with the coolant being in fluid form at excess pressure and including a gaseous component and a liquid component, the improvement wherein said pressure relief system comprises a pressure relief station with an inlet and an outlet with the outlet open to the atmosphere and with the inlet connected to and located downstream of at least one of said reactor pressure vessel and protective vessel for receiving the fluid coolant at excess pressure to be relieved and for purifying the coolant and discharging it in vapor form into the atmosphere, means located at the inlet for forming a seal using a liquid for preventing the coolant from entering the pressure relief station until a predetermined increase in pressure in the coolant takes place, means in said pressure relief station for washing radioactive fission products from said fluid coolant for rendering the coolant sufficiently clean and dry for discharge into the atmosphere; and said means of washing includes means for providing a cylonic effect for separating liquid from the fluid coolant, said means for providing a cyclonic effect comprises a first cyclone and a second cyclone with said first and second cyclones connected in series, said first cyclone located upstream from said second cyclone and being constructed as a washing cyclone and said second cyclone being constructed as a drying cyclone, said means forming a seal includes a liquid reservoir located at said inlet and connected between said at least one of the reactor pressure vessel and protective vessel and said washing cyclone and said liquid reservoir having a liquid level dividing the reservoir into a liquid space and an upper gas collecting space, so that when the fluid coolant experiences the predetermined increase in pressure it passes through said liquid reservoir and divides into the gaseous component entering the gas collecting space and the liquid component remaining in the liquid space with the gaseous component flowing from said gas collecting space to said washing cyclone.

2. A reactor as claimed in claim 1, wherein said pressure relief station includes a cooling circuit connected to said washing cyclone for receiving liquid separated out in said washing cyclone for processing the separated liquid and for returning the separated liquid into said washing cyclone.

3. A reactor as claimed in claim 1, wherein said pressure relief station includes a cooling circuit for receiving liquid from said liquid reservoir and for returning cooled liquid to said liquid reservoir.

4. A reactor as claimed in claim 2, wherein a liquid discharge line is connected to said washing cyclone for receiving separated liquid therefrom, said liquid discharge line connected to said cooling circuit, and a washing liquid tank connected to said liquid discharge line for receiving the separated liquid from said washing cyclone and for supplying liquid into said cooling circuit.

5. A reactor as claimed in claim 2 or 3, wherein said cooling circuit includes a gas separator.

6. A reactor according to claim 5, wherein said cooling circuit includes a cooler located downstream from said gas separator in the direction of flow of liquid through said cooling circuit.

7. A reactor as claimed in claim 6, wherein said cooling circuit includes an ion exchanger downstream from said cooler.

8. A reactor as claimed in claim 5, wherein an inert gas retention plant is connected to said gas separator.

9. A reactor as set forth in claim 7, wherein said ion exchanger comprises an alluvial filter containing deposited powder resins.

10. A reactor as claimed in claim 1, comprising a light water reactor and said means for washing comprises a washing cyclone using a washing liquid comprising water containing a chemical additive for promoting the solubility of iodine in the water.

11. A reactor as claimed claim 10, wherein a washing liquid cooling circuit is connected to said washing cyclone and said circuit includes a storage vessel for receiving the washing liquid from said washing.

12. A reactor as claimed in claim 11, including a coolant feed duct for flowing the fluid coolant into said liquid reservoir, and said coolant feed duct includes a nozzle system opening into said liquid space in said liquid reservoir and located below the liquid level so that the separation liquid in said liquid space forms the liquid seal in said liquid reservoir.

13. A reactor as claimed in claim 12, wherein a coolant feed line connects said gas collecting space in said closed vessel to said washing cyclone.

14. A reactor according to claim 12 or 13, wherein said coolant feed duct is connected between the reactor pressure vessel and said nozzle system of said liquid reservoir and includes an excess pressure valve.

15. A reactor as claimed in claim 1, wherein the cleaned and drying coolant is discharged to the atmosphere from said dry cyclone and includes a coolant extraction line and a sprinkler pond connected to said coolant extraction line for receiving the coolant for separating chemical additives from the coolant.

16. A reactor as claimed in claim 1, wherein the cleaned and dry coolant is discharged directly from said drying cyclone to the atmosphere.

17. A reactor as claimed in claim 1, wherein said drying cyclone includes a moisture discharge line, and a residual humidity vessel is connected to said drying cyclone via said moisture discharge line.

18. A reactor as claimed in claim 1, wherein said reactor is a light water reactor.

19. A reactor as claimed in claim 1, wherein said reactor is a helium-cooled high-temperature reactor.

20. A reactor as claimed in claim 7, wherein an inert gas retention plant is connected to said gas separator.

* * * * *